United States Patent
Shimizu

(10) Patent No.: US 9,863,469 B2
(45) Date of Patent: Jan. 9, 2018

(54) BEARING PRELOADING DEVICE

(71) Applicant: NTN CORPORATION, Osaka (JP)

(72) Inventor: Yasuhiro Shimizu, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/035,562

(22) PCT Filed: Oct. 31, 2014

(86) PCT No.: PCT/JP2014/079051
§ 371 (c)(1),
(2) Date: May 10, 2016

(87) PCT Pub. No.: WO2015/072352
PCT Pub. Date: May 21, 2015

(65) Prior Publication Data
US 2016/0290394 A1 Oct. 6, 2016

(30) Foreign Application Priority Data

Nov. 13, 2013 (JP) .................... 2013-234769

(51) Int. Cl.
*F16C 25/08* (2006.01)
*F16C 33/60* (2006.01)
(Continued)

(52) U.S. Cl.
CPC .......... *F16C 25/083* (2013.01); *F16C 19/385* (2013.01); *F16C 33/586* (2013.01);
(Continued)

(58) Field of Classification Search
CPC .... F16C 19/385; F16C 25/083; F16C 33/586; F16C 33/60; F16C 33/783; F16C 33/7886;
(Continued)

(56) References Cited

U.S. PATENT DOCUMENTS 2,597,161 A * 5/1952 Mancia .................. B23Q 1/265
384/608
3,003,836 A 10/1961 Hill
(Continued)

FOREIGN PATENT DOCUMENTS

CN 101799040 8/2010
DE 499877 6/1930
(Continued)

OTHER PUBLICATIONS

Extended European Search Report dated Nov. 3, 2016 in corresponding European Application No. 14861645.1.
(Continued)

*Primary Examiner* — Marcus Charles
(74) *Attorney, Agent, or Firm* — Wenderoth, Lind & Ponack, L.L.P.

(57) ABSTRACT

In a bearing preloading device in which a compression coil spring is used, a hole is defined in a bearing race or in a separate member axially opposed to the bearing race. The hole has an inner periphery constituted by a threaded portion connected to a bottom surface of the hole, and a shallow hole portion connected to an edge of the hole. An inner diameter of the shallow hole portion is larger than an inner diameter of the threaded portion.

10 Claims, 4 Drawing Sheets

(51) Int. Cl.
*F16C 19/38* (2006.01)
*F16C 33/58* (2006.01)
*F16C 33/78* (2006.01)

(52) U.S. Cl.
CPC ............ *F16C 33/60* (2013.01); *F16C 33/783* (2013.01); *F16C 33/7886* (2013.01); *F16C 2226/60* (2013.01); *F16C 2229/00* (2013.01); *F16C 2240/14* (2013.01); *F16C 2322/12* (2013.01)

(58) Field of Classification Search
CPC .............. F16C 2226/60; F16C 2229/00; F16C 2240/14; F16C 2322/12; F16C 35/061; F16C 19/28; F16C 33/7889
USPC ................... 384/585, 56–564, 572, 583, 620
See application file for complete search history.

(56) References Cited

U.S. PATENT DOCUMENTS

| | | | | |
|---|---|---|---|---|
| 3,025,631 A * | 3/1962 | Reynolds | ............... | A47B 91/06 16/42 R |
| 3,900,232 A * | 8/1975 | Rode | ........................ | F16C 19/54 29/898.09 |
| 4,227,755 A * | 10/1980 | Lundberg | ................ | F01C 21/02 384/101 |
| 4,641,978 A * | 2/1987 | Kapich | .................... | F01D 25/16 310/90.5 |
| 4,732,495 A * | 3/1988 | Brandenstein | ........ | F16C 25/083 384/518 |
| 4,856,914 A * | 8/1989 | Sigg | ........................ | F16C 17/04 384/223 |
| 4,913,564 A | 4/1990 | Stephan et al. | | |
| 4,958,628 A * | 9/1990 | Iwamoto | ............ | A61H 23/0263 601/72 |
| 5,316,393 A * | 5/1994 | Daugherty | ............ | F16C 25/083 384/517 |
| 5,433,536 A * | 7/1995 | Bergling | .................. | F16C 19/30 384/563 |
| 6,609,675 B2 * | 8/2003 | Strater | ................... | B23K 3/029 206/409 |
| 7,918,608 B2 * | 4/2011 | Braun | ...................... | F16C 19/54 384/500 |
| 8,376,627 B2 * | 2/2013 | Oakley | ................... | F16C 19/36 384/608 |
| 9,046,130 B2 * | 6/2015 | Kachinski | ............. | F01D 25/162 |
| 2002/0040947 A1 * | 4/2002 | Strater | ................... | B23K 3/029 242/588.3 |

FOREIGN PATENT DOCUMENTS

| | | | | |
|---|---|---|---|---|
| DE | 10 2004 048 720 | | 4/2006 | |
| JP | 52022112 A | * | 2/1977 | .............. F04B 39/12 |
| JP | 59-25708 | | 2/1984 | |
| JP | 61-46251 | | 12/1986 | |
| JP | 1-269714 | | 10/1989 | |
| JP | 10-184677 | | 7/1998 | |
| JP | 2003-307210 | | 10/2003 | |
| JP | 2006-162011 | | 6/2006 | |
| JP | 2006-194418 | | 7/2006 | |
| JP | 2007-51669 | | 3/2007 | |
| JP | 2007-285384 | | 11/2007 | |
| JP | 4746469 | | 5/2011 | |

OTHER PUBLICATIONS

International Search Report dated Feb. 10, 2015 in corresponding International Application No. PCT/JP2014/079051 (with English translation).
Written Opinion of the International Searching Authority dated Feb. 10, 2015 in corresponding International Application No. PCT/JP2014/079051 (with English translation).
Office Action dated Nov. 1, 2017 in Chinese Application No. 201480062230.9 (with English translation of Search Report).

* cited by examiner

Fig.3
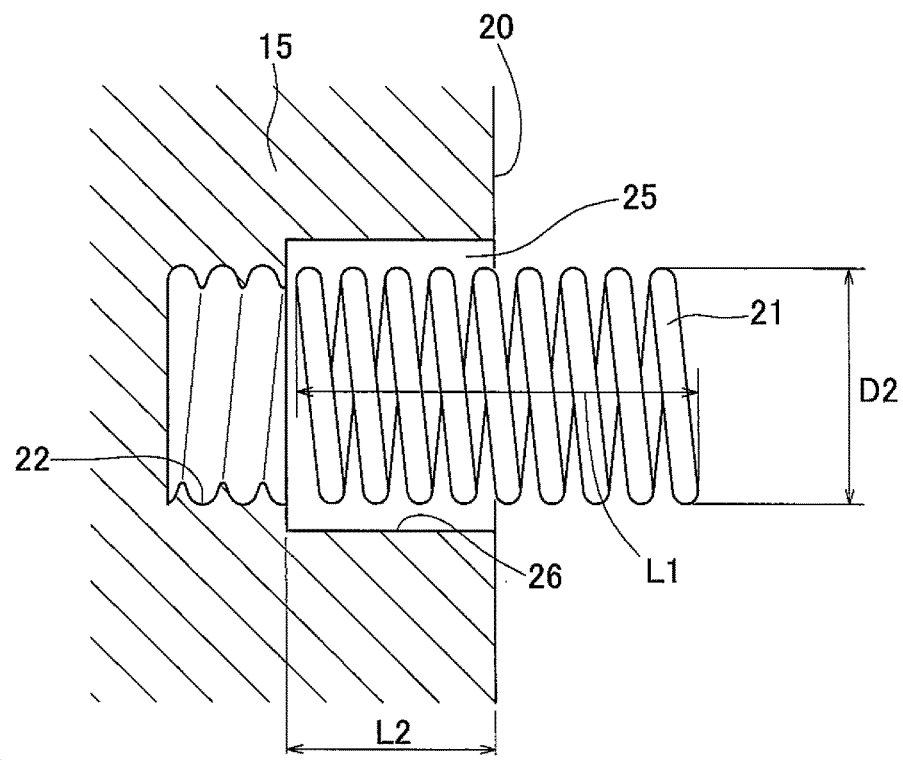
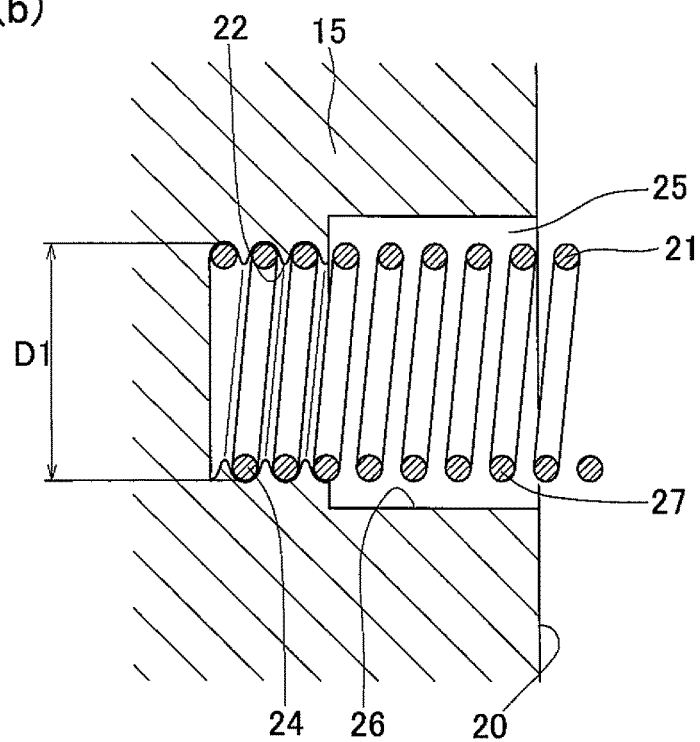

BEARING PRELOADING DEVICE

CROSS-REFERENCE TO RELATED APPLICATION

This application is the National Stage of International Application No. PCT/JP2014/079051, filed Oct. 31, 2014 which is based on and claims the benefit of priority from Japanese Patent Application No. 2013-234769, filed on Nov. 13, 2013, the contents of which are incorporated herein by reference.

TECHNICAL FIELD

The present invention relates to a bearing preloading device for applying a preload to a rolling bearing.

BACKGROUND ART

Conventionally, it is carried out to axially push a bearing race such that a gap in the interior of a bearing disappears, namely, to apply a preload to a rolling bearing. If the accuracy management of a bearing is difficult, or if there is a restriction due to the structure of a bearing housing around a bearing, a bearing race is axially pushed by a spring in some cases. As one of such bearing preloading devices, a bearing preloading device (as disclosed in Japanese Patent No. 4746469) is known in which at least one compression coil spring axially pushes a bearing race. Such a bearing preloading device is used, for example, for applying a preload to a double-row tapered roller bearing receiving a thrust load and supporting a work roller of a steel rolling machine.

In the case of an open-type bearing of which the interior is not filled with grease, as disclosed in Japanese Patent No. 4746469, drilled holes are formed in respective bearing races such that compression coil springs can be inserted into the respective drilled holes. In the case of a bearing in which grease is sealed inside of the bearing by oil seals provided separately from the bearing races and fixed to a housing, drilled holes are formed in annuli of the respective oil seals such that compression coil springs can be inserted into the respective drilled holes. In both cases, when the bearing is mounted, the compression coil springs are inserted into the respective drilled holes, and compressed to a predetermined extent, thereby generating an axial spring force. This spring force is applied to the bearing races.

Problems to be Solved by the Invention

However, in the bearing preloading device disclosed in Japanese Patent No. 4746469, a plunger, a sleeve and rod-shaped member, or a plunger and a snap ring are used so as to prevent each compression coil spring from being pulled out of the corresponding drilled hole. Since these components are separately provided anti-pullout components, the number of bearing components increases by providing such anti-pullout components, so that this is not suitable for a small quantity of production. Though it is possible to omit such anti-pullout components, if such anti-pullout components are omitted, when the bearing is mounted, since it is necessary to carefully handle the bearing such that the compression coil springs are not pulled out of the respective drilled holes, it is time-consuming.

SUMMARY OF THE INVENTION

It is an object of the present invention to provide a bearing preloading device capable of easily preventing a compression coil spring from being pulled out without separately using anti-pullout components.

Means for Solving the Problems

In order to achieve the above object, the present invention provides a bearing preloading device comprising at least one compression coil spring configured to axially push a bearing race, characterized in that the bearing preloading device further comprises a threaded portion into which the compression coil spring can be axially screwed so as to be threadedly engaged in the threaded portion, wherein the threaded portion is formed in one of the bearing race and a separate member from the bearing race, the separate member being axially opposed to the bearing race.

Effects of the Invention

Since the bearing preloading device according to the present invention is configured such that the compression coil spring can be attached directly to the threaded portion formed in one of the bearing race and the separate member, it is possible to prevent the compression coil spring from being pulled out without separately using anti-pullout components.

BRIEF DESCRIPTION OF THE DRAWINGS

FIG. 3(a) is a partial sectional view illustrating a threaded portion with a compression coil spring according to the first example pulled out of the threaded portion.

FIG. 3(b) is a partial sectional view illustrating the state in which the compression coil spring is threadedly engaged in the threaded portion.

BEST MODE FOR CARRYING OUT THE INVENTION

Regarding the above-described bearing preloading device according to the present invention, its preferred embodiments are now described.

In the first preferred embodiment, one of the bearing race and the separate member has an inner periphery defining an axially recessed hole, and comprising the threaded portion, connected to a bottom surface of the hole, and a shallow hole portion connected to an edge of the hole, and having an inner diameter larger than an inner diameter of the threaded portion, wherein the shallow hole portion is concentric with the threaded portion, and has an inner diameter larger than an outer diameter of the compression coil spring, wherein the compression coil spring has such a natural length that when the compression spring is not compressed, the compression coil spring axially protrudes from the shallow hole portion, and wherein an axial length of the shallow hole portion is set such that the compression coil spring can be compressed until the compression coil spring is entirely received in the hole. In the first preferred embodiment, it is possible to generate an appropriate spring force by appropriately setting the compression amount of the compression coil spring in view of how much the compression coil spring axially protrudes from the edge of the shallow hole portion so as to obtain a predetermined spring force, and by simply compressing the compression coil spring until the compression coil spring is entirely received in the hole when a rolling bearing is mounted.

In the second preferred embodiment, the threaded portion is formed in the bearing race, and the compression coil spring can be attached directly to the bearing race. It is also possible to combine the second preferred embodiment with the first preferred embodiment.

In the third preferred embodiment, the bearing preloading device further comprises an oil seal including an annulus, wherein the separate member comprises the annulus, and wherein the threaded portion is formed in the separate member.

Moreover, the compression coil spring can be attached directly to the annulus. It is also possible to combine the third preferred embodiment with the first preferred embodiment.

In the fourth preferred embodiment, the bearing race comprises a component of a rolling bearing supporting a rolling roller shaft of a steel rolling machine. Since such a compression coil spring is used in the bearing preloading device according to the present invention, the device is suitable for a bearing for a steel rolling machine. It is also possible to combine the fourth preferred embodiment with one or more of the first to third preferred embodiments.

EXAMPLES

Figure 1:
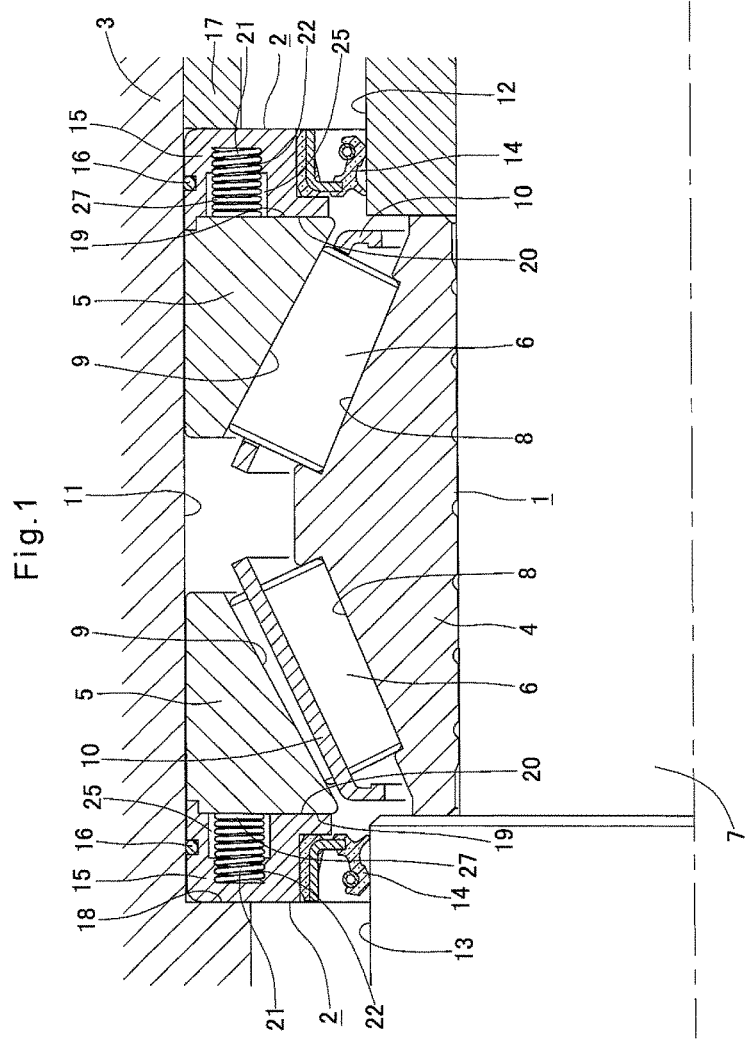
FIG. 1 is a sectional view illustrating the entire structure of a bearing preloading device according to a first example of the present invention.

The first example according to the present invention is now described with reference to the attached drawings. As illustrated in FIG. 1, the first example includes a rolling bearing 1, oil seals 2, and a bearing housing 3.

The rolling bearing 1 includes an inner bearing race 4, outer bearing races 5, and a plurality of rolling elements 6. A shaft 7 is supported relative to the bearing housing 3 by the rolling bearing 1, specifically, by the inner and outer bearing races 4, 5 and the rolling elements 6. The inner bearing race 4 is a bearing component having raceways 8. Each outer bearing race 5 is a bearing component having a raceway 9. The inner bearing race 4 is attached to the shaft 7. The outer bearing races 5 are attached to the bearing housing 3. Hereinafter, the direction along the center axis of the shaft 7 is referred to as "axial direction". Also, unless otherwise specified, the terms "inner" and "outer" refer, respectively, to positions/portions close to, and remote from, the center axis of the shaft 7 in the radial direction perpendicular to the axial direction.

Figure 2:
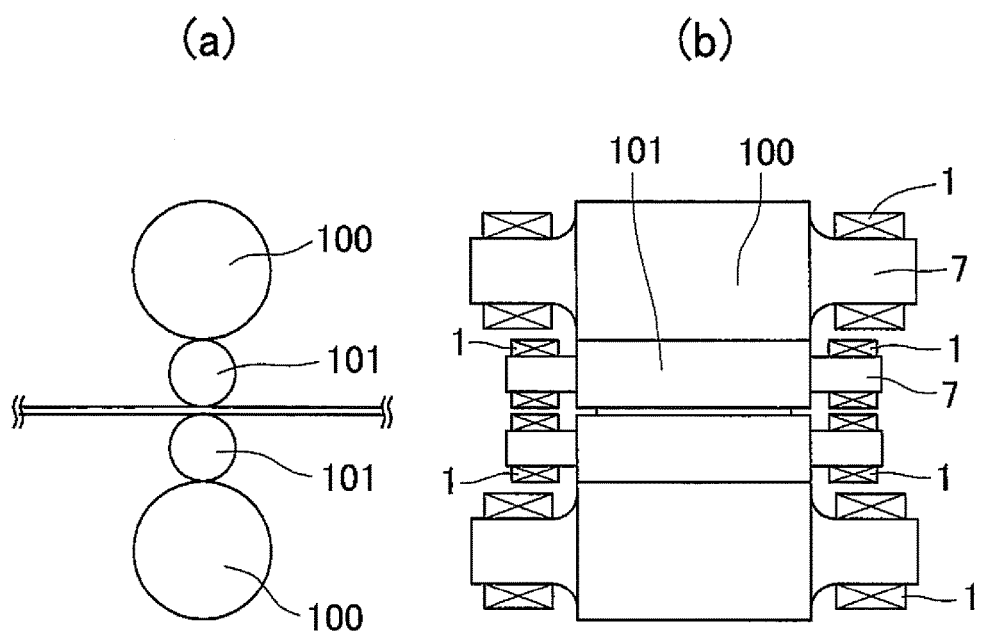
FIG. 2(a) is a schematic diagram illustrating, from the axial direction, the main portion of a steel rolling machine according to the first example of the present invention.
FIG. 2(b) is a schematic diagram illustrating the main portion of the steel rolling machine from the rolling direction perpendicular to the axial direction.

As can be seen from FIGS. 2(a) and 2(b), schematically illustrating the main portion of a steel rolling machine, a plurality of the above-mentioned shafts 7 are used as rolling roller shafts each comprising, for example, a rotary shaft of a backup roller 100 or a rotary shaft of a work roller 101.

As illustrated in FIG. 1, the rolling bearing 1 is a double-row tapered roller bearing including the inner bearing race 4, namely, a single inner bearing race, the outer bearing races 5, which consist of two outer bearing races, the rolling elements 6, which are double-row rolling elements, and retainers 10 which retain the rolling elements 6. The inner bearing race 4 is fitted on a fitting surface of the shaft 7.

The bearing housing 3 has an inner peripheral portion 11 defining a housing hole. The inner peripheral portion 11 includes fitting surfaces on which the outer bearing races 5 are fitted, and fitting surfaces on which the oil seals 2 are fitted. The oil seals 2 seal the rolling bearing 1.

Each oil seal 2 is an annulus-attached oil seal including a deformable portion 14 kept in sliding contact with a seal surface 12 or 13, and an annulus 15 connected to the deformable portion 14. The annulus 15 has an outer peripheral portion fitted on the inner peripheral portion 11 of the bearing housing 3, and is more rigid than the deformable portion 14. An O-ring 16 seals the space between the inner peripheral portion 11 and the annulus 15. The annulus 15 is not limited to a single integral component as illustrated in FIG. 1, and may be constituted by an auxiliary annulus member and an outer annulus member.

The annuli 15 fitted in the inner peripheral portion 11 of the bearing housing 3 are axially opposed to the respective bearing races 5. The annuli 15 are thus separate members from the bearing races 5.

When mounting the rolling bearing 1,7, the axial displacements of the annuli 15 and the bearing races 5 fitted on the inner peripheral portion 11 of the bearing housing 3 are restricted. Specifically, a restricting member 17 fixed to the housing bearing 3 restricts the axial rightward displacement of the bearing race 5 illustrated on the right side of FIG. 1, and a housing shoulder 18 formed on the inner peripheral portion 11 restricts the axial leftward displacement of the bearing race 5 illustrated on the left side of FIG. 1. Due to these restrictions, the opposed side surfaces 19 of the bearing races 5 opposed to the respective annuli 15 are kept in abutment, in the axial direction, with the opposed side surfaces 20 of the respective annuli 15 opposed to the respective bearing races 5. In order to avoid the occurrence of unnecessary component force due to the abutment of the opposed side surfaces 19 and 20, the opposed side surfaces 19 and 20 each comprises a flat surface formed to be perpendicular to the axial direction. The opposed side surface 19 of each bearing race 5 comprises, for example, one of both side surfaces of the bearing race 5 defining the width of the bearing race 5.

The bearing preloading device of the first example for applying a preload to the rolling bearing 1 includes, in each annulus 15, at least one compression coil spring 21, and a threaded portion 22 in which the compression spring 21 can be threadedly engaged.

As illustrated in FIG. 3(a), the compression coil spring 21 helically extends from one end of the compression coil spring 21 to the other end. The pitch of the threaded portion 22 is set to coincide with that of the compression coil spring 21 in its natural length/state. Therefore, as illustrated in FIG. 3(b), by screwing the compression coil spring 21 into a groove of the threaded portion 22 from one end of the compression coil spring 21, the compression coil spring 21 can be threadedly engaged in the threaded portion 22.

The term "threadedly engaged" means that as illustrated in FIGS. 3(a) and 3(b), by screwing the compression coil spring 21 into the groove of the threaded portion 22 from one end of the compression coil spring 21 such that the coil portion 24 of the compression coil spring 21 screwed into this groove is engaged in the threaded portion 22 in the axial and radial directions, the compression coil spring 21 is retained only by the threaded portion 22, and the engaged coil portion 24 has the retaining strength by which the compression coil spring 21 can be axially compressed within a predetermined range. Therefore, by simply turning the compression coil spring 21 in the opposite direction to the direction in which the compression coil spring 21 is screwed into the threaded portion 22, it is possible to pull the compression coil spring 21 out of the threaded portion 22.

As illustrated in FIGS. 1 and 3(a), the threaded portions 22 are formed in the respective annuli 15. The center axis of each threaded portion 22 corresponds to the axial direction.

Each annulus 15 has an inner periphery defining an axially recessed a hole 25, and comprising the threaded portion 22, connected to the bottom surface of the hole 25, and a shallow hole portion 26 connected to the edge of the hole 25 and having an inner diameter larger than that of the threaded portion 22. When, as illustrated in FIG. 3(b), one end of the compression coil spring 21 comes into contact with the bottom surface of the hole 25, the compression coil spring 21 cannot be screwed any further into the groove of the threaded portion 22.

As described above, in the first example illustrated in FIG. 1, since the compression coil springs 21 can be attached directly to the respective annuli 15, it is possible to prevent the compression coil springs 21 from being pulled out of the respective annuli 15 without separately using anti-pullout components.

As illustrated in FIGS. 3(a) and 3(b), if the coil portion 24 is screwed into the groove of the threaded portion 22 by one turn or more, the coil portion 24 can be threadedly engaged in the threaded portion 22. Though it is ideal that the pitch of the threaded portion 22 completely coincides with that of the compression coil spring 21 in its natural length/state, the former does not need to strictly coincide with the latter. Namely, it is possible to appropriately set the pitch of the threaded portion 22, provided that the compression coil spring 21 can be threadedly engaged in the threaded portion 22.

The contact diameter D1 of the portion of the compression coil spring 21 kept in contact with the threaded portion 22 is set to be smaller than the outer diameter D2 of the compression coil spring 21 when not compressed. This diametrical interference (D2−D1) prevents the coil portion 24 from becoming loose or unstable.

The shallow hole portion 26 is concentric with the threaded portion 22, and has an inner diameter larger than the outer diameter D2 of the compression coil spring 21. The natural length L1 of the compression coil spring 21 is determined such that the compression coil spring 21 axially protrudes from the shallow hole portion 26 with the compression coil spring 21 threadedly engaged in the threaded portion 22, and not compressed. The axial length L2 of the shallow hole portion 26 is set such that the compression coil spring 21 can be compressed until the compression coil spring 21 is entirely received in the hole 25. Namely, with the compression coil spring 21 threadedly engaged in the threaded portion 22, the coil portion 27 of the compression coil spring 21 located partially inside of the shallow hole portion 26 and partially axially outwardly of the hole 25 can be axially stretched and compressed without being restricted by the threaded portion 22 and without being interfered with by the shallow hole portion 26. Therefore, the coil portion 27 substantially constitutes active coils in the compression coil spring 21.

In order to prevent the compression coil spring 21 from getting caught on the shallow hole portion 26, the shallow hole portion 26 has a cylindrical shape. Such a shallow hole portion 26 can be easily formed by a drill.

Each annulus 15 is preferably provided with a plurality of the threaded portions 22. In such a case, the number of the threaded portions 22 needs to be the same as or larger than the number of the at least one compression coil spring 21 used in the bearing preloading device, and also, in order to prevent the bearing races 5 illustrated in FIG. 1 from tilting, it is preferable that the threaded portions 22 of each annulus 15 are arranged so as to be equidistantly spaced apart from each other in the circumferential direction. The "circumferential direction" means the circumferential direction around the shaft 7.

When mounting the rolling bearing 1, by bringing the opposed side surfaces 19 into abutment with the respective opposed side surfaces 20 in the axial direction, the coil portions 27 can be axially compressed until the compression coil springs 21 are entirely received in the respective holes 25. Due to this compression, the coil portions 27 generate a spring force, thereby axially pushing the bearing races 5. The compression amount of each compression coil spring 21 (which means "how much the compression coil spring 21 is axially compressed") depends on the axial length of the portion of the coil portion 27 axially protruding from the edge of the shallow hole portion 26, which is included in the opposed side surface 20 (see FIG. 3(b)). Therefore, in the first example, it is possible to generate an appropriate spring force by appropriately setting the compression amount of the compression coil spring 21 in view of how much the compression coil spring 21 axially protrudes from the edge of the shallow hole portion 26 so as to obtain a predetermined spring force, and by simply compressing the compression coil spring 21 until the compression coil spring 21 is entirely received in the hole 25 as illustrated in FIG. 1 when mounting the rolling bearing 1 in position.

Moreover, in the first example, on the basis of the state in which the compression coil spring 21 has been screwed to the limit, namely, screwed until it is brought into abutment with the bottom surface of the hole 25 as illustrated in FIG. 3(b), it is possible to appropriately set the compression amount of the compression coil spring 21 as describe above. Therefore, it is possible to generate a predetermined spring force by simply screwing the coil spring 21 until the compression coil spring 21 is "completely" threadedly engaged in the threaded portion 22, and bringing the opposed side surfaces 19 and 20 into abutment with each other as illustrated in FIG. 1.

Generally, in compression coil springs, if the number of active coils is less than three, spring performance becomes unstable, and the difference between a spring constant obtained from a basic formula and an actual spring constant obtained in an experiment, etc. tends to be large. Therefore, it is preferable that the number of the active coils of the coil portion 27 is three or more. If the number of the active coils of the coil portion 27 is less than 1.5, it is very difficult to form such a compression spring coil into a helical shape. If the shallow hole portion 26 is omitted such that the depth of the hole 25 is made shallow, it is difficult to sufficiently screw the compression coil spring 21, and to obtain a sufficient number of active coils in the compression coil spring 21. Therefore, it is preferable to secure an appropriate number of active coils in the compression coil spring 21 by forming the shallow hole portion 26 as in the first example.

Figure 4:
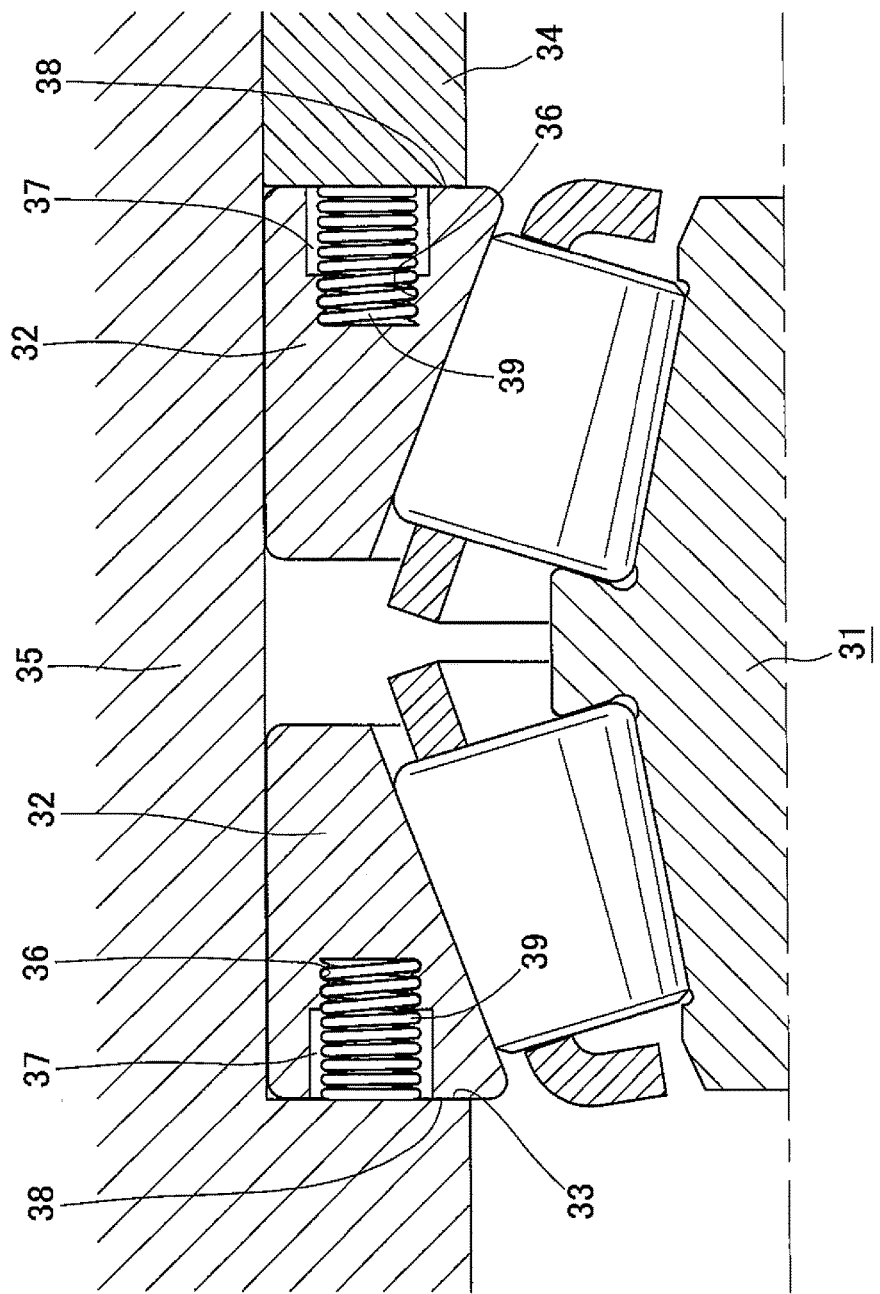
FIG. 4 is a sectional view illustrating the main portion of a bearing preloading device according to a second example of the present invention.

The second example according to the present invention is now described with reference to FIG. 4. Only the features different from those of the first example are described in the second example. A rolling bearing 31 of the second example is an open-type bearing, of which the interior is not filled with grease. Therefore, oil seals are not used in the rolling bearing 31. The bearing race 32 illustrated on the left side of FIG. 4 is axially opposed to a housing shoulder 33 of a bearing housing 35 which is a separate member from the bearing races 32. The bearing race 32 illustrated on the right side of FIG. 4 is axially opposed to a restricting member 34 which is also a separate member from the bearing races 32. Threaded portions 36 are formed in the respective bearing races 32. Holes 37 are formed in the bearing races 32 so as to be axially recessed from opposed side surfaces 38 of the respective bearing races 32. In the second example, compression coil springs 39 can be attached directly to the respective bearing races 32. Therefore, even when a preload is applied to such an open-type bearing having no oil seals, it is possible to use the bearing preloading device according to the present invention.

While in the above first and second examples, the threaded portions are formed in the inner peripheries of the respective holes as one example, not such holes but through holes may be axially formed in the respective annuli or the respective bearing races, and the threaded portions each may comprise an internal thread formed on the cylindrical inner periphery of the annulus or the bearing race defining the through hole. Also, the threaded portions each may comprise an external thread. For example, by forming circumferential grooves such that the circumferential grooves are recessed from opposed side surfaces of the respective annuli or the respective bearing races, and forming an external thread on the axial protrusion defining one wall of each circumferential groove, the compression oil springs can be threadedly engaged with the respective external threads. The technical scope of the present invention is not limited to the above preferred embodiments and examples, and includes all modifications within the scope of the technical ideas based on the claims.

DESCRIPTION OF REFERENCE NUMERALS 1, 31: rolling bearing
2: oil seal
3, 35: bearing housing
4, 5, 32: bearing race
6: rolling element
7: shaft (rolling roller shaft)
15: annulus
17, 34: restricting member
18, 33: housing shoulder
19, 20, 38: opposed side surface
21, 39: compression coil spring
22, 36: threaded portion
25, 37: hole
26: shallow hole portion
100: backup roller
101: work roller

The invention claimed is:

1. A bearing preloading device comprising:
at least one compression coil spring configured to axially push a bearing race; and
a threaded portion into which the compression coil spring can be axially screwed so as to be threadedly engaged in the threaded portion,
wherein the threaded portion is defined in one of the bearing race and a separate member from the bearing race, the separate member being axially opposed to the bearing race,
wherein the one of the bearing race and the separate member has an inner periphery defining an axially recessed hole, and comprising the threaded portion, connected to a bottom surface of the hole, and a shallow hole portion connected to an edge of the hole,
wherein an inner diameter of the shallow hole portion is larger than an inner diameter of the threaded portion,
wherein the shallow hole portion is concentric with the threaded portion, and the inner diameter of the shallow hole portion is larger than an outer diameter of the compression coil spring,
wherein the compression coil spring has a natural length such that, when the compression spring is not compressed, the compression coil spring axially protrudes from the shallow hole portion, and
wherein an axial length of the shallow hole portion is set such that the compression coil spring can be compressed until the compression coil spring is entirely received in the hole.

2. The bearing preloading device according to claim 1, wherein the threaded portion is defined in the bearing race.

3. The bearing preloading device according to claim 2, wherein the bearing race comprises a component of a rolling bearing supporting a rolling roller shaft of a steel rolling machine.

4. The bearing preloading device according to claim 1, further comprising an oil seal including an annulus,
wherein the separate member comprises the annulus, and
wherein the threaded portion is defined in the separate member.

5. The bearing preloading device according to claim 4, wherein the bearing race comprises a component of a rolling bearing supporting a rolling roller shaft of a steel rolling machine.

6. The bearing preloading device according to claim 1, wherein the bearing race comprises a component of a rolling bearing supporting a rolling roller shaft of a steel rolling machine.

7. The bearing preloading device according to claim 6, further comprising a restricting member for restricting axial displacement of the bearing race, the restricting member being fixed to a housing of the rolling bearing.

8. The bearing preloading device according to claim 6, further comprising a housing shoulder for restricting axial displacement of the bearing race, the housing shoulder being integral with an inner peripheral portion of a housing of the rolling bearing.

9. The bearing preloading device according to claim 1, further comprising an oil seal including a deformable portion configured to be in sliding contact with a seal surface, and an annulus connected to the deformable portion,
wherein the separate member comprises the annulus.

10. The bearing preloading device according to claim 1, wherein:
the compression coil spring helically extends from a first end of the compression coil spring to a second end of the compression coil spring, and
a contact diameter of a portion of the compression coil spring configured to be in contact with the threaded portion is smaller than an outer diameter of the compression coil spring when not compressed.

* * * * *